UNITED STATES PATENT OFFICE.

LUDWIG VANINO, OF MUNICH, GERMANY.

SELF-LUMINOUS BODY.

No. 850,860. Specification of Letters Patent. Patented April 16, 1907.

Application filed September 6, 1906. Serial No. 333,481. (Specimens.)

*To all whom it may concern:*

Be it known that I, LUDWIG VANINO, of 31 Barerstrasse, Munich, in the Empire of Germany, have invented new and useful Improvements in a Self-Luminous Body, of which the following is a specification.

As is well known, the self-luminous bodies, the so-called "Balmain" bodies or "Bologna" luminous stones, are based on the sulfids of the alkaline earths. In more recent times it has been found that the illuminating power of these bodies is increased by the addition thereto of small quantities of other salts. For example, it was observed in connection with the violet luminous bodies that a small addition of bismuth salts considerably increased the luminous effect.

According to the present invention the luminous effect of the violet bodies is considerably increased in a striking manner if small quantities of thorium be added, especially in the presence of lithium. Thallium also for the purpose of my invention is the equivalent of thorium and may be used in the same way and forms a part of my invention. A substance produced in this manner is distinguished from all other existing luminous substances by the beauty and intensity of the light and is pulverous or granular.

Luminous substance produced by my process may be used for any of the well-known purposes—for example, for ornaments, as a coating for objects, which, for instance, are to be visible in the evening or at night, such as clock-dials, night-stands, walls, ceilings, road-signs, turnpikes, advertising signboards, &c.

In order to impart to this substance an appearance like stone and a suitable degree of hardness, it is put into certain melted materials. For example, potassium nitrate is melted and the luminous powder put into the melted material. The substance, which after cooling is exceedingly hard, is cut into pieces having an appearance exactly like that of ordinary stones. By this means, moreover, the power of the substance to withstand the influence of bad weather is increased.

I do not wish to limit my invention to the use of any specific proportions of the substances employed; but the following proportions may be mentioned as examples:

Example 1: (Thorium or thallium.) Two parts calcium oxid, two parts sulfur, 0.40 parts starch, 0.20 parts potassium or sodium sulfate, 0.15 parts bismuth solution, (one gram nitrate, one hundred centimeters alcohol,) 0.10 parts thorium-nitrate solution, (one gram to two hundred centimeters alcohol,) variable amount of potassium nitrate sufficient to bind the product.

Example 2: (Lithium with thallium or thorium.) Two parts calcium oxid, two parts sulfur, 0.40 parts starch, 0.20 parts lithium carbonate, 0.20 parts potassium sulfate, 0.15 parts bismuth solution, 0.03 parts thallium-sulfate solution, (one gram, one hundred centimeters water,) variable amount of potassium nitrate sufficient to bind the product.

What I claim as my invention, and desire to secure by Letters Patent, is—

1. A luminous body comprising a self-luminous substance and a thorium salt.

2. A luminous body comprising a self-luminous substance and a lithium salt and thorium salt.

3. A luminous body comprising a self-luminous substance incorporated with potassium nitrate.

4. A luminous body comprising a self-luminous substance and a thorium salt, incorporated with potassium nitrate.

5. A luminous body comprising a self-luminous substance and a lithium salt and thorium salt, incorporated with potassium nitrate.

In testimony whereof I have set hereunto my hand in the presence of two witnesses.

LUDWIG VANINO.

Witnesses:
FERDINAND HARTL,
LOUIS MUELL.